United States Patent
Chen

(10) Patent No.: US 9,413,244 B2
(45) Date of Patent: Aug. 9, 2016

(54) VOLTAGE CONVERSION CIRCUIT WITH VOLTAGE SELECTION OF TRANSISTOR BULK

(71) Applicant: ANPEC ELECTRONICS CORPORATION, Hsinchu (TW)

(72) Inventor: Chih-Ning Chen, Taipei (TW)

(73) Assignee: Anpec Electronics Corporation, Hsinchu (TW)

( * ) Notice: Subject to any disclaimer, the term of this patent is extended or adjusted under 35 U.S.C. 154(b) by 338 days.

(21) Appl. No.: 14/166,978

(22) Filed: Jan. 29, 2014

(65) Prior Publication Data

US 2015/0137777 A1 May 21, 2015

(30) Foreign Application Priority Data

Nov. 20, 2013 (TW) .............................. 102142241 A

(51) Int. Cl.
*H02M 3/156* (2006.01)
*H02M 3/158* (2006.01)
*H02M 1/00* (2006.01)
*H02M 1/08* (2006.01)

(52) U.S. Cl.
CPC .............. *H02M 3/1588* (2013.01); *H02M 1/08* (2013.01); *H02M 2001/0048* (2013.01); *Y02B 70/1466* (2013.01); *Y02B 70/1491* (2013.01)

(58) Field of Classification Search
CPC .............. H02M 3/156; H02M 3/1588; H02M 2001/0048; H02M 2001/0054; H02M 1/08
See application file for complete search history.

(56) References Cited

U.S. PATENT DOCUMENTS

| | | | |
|---|---|---|---|
| 6,366,070 B1 * | 4/2002 | Cooke ................. | H02M 3/1588 323/222 |
| 7,649,346 B2 | 1/2010 | Sohma | |
| 8,456,143 B2 | 6/2013 | Nakashima | |
| 2006/0007618 A1 * | 1/2006 | Leyk ..................... | H02M 3/158 361/90 |
| 2007/0194759 A1 * | 8/2007 | Shimizu ................ | H02J 7/0016 320/166 |
| 2008/0001553 A1 * | 1/2008 | Qiu ..................... | H02M 3/1588 315/307 |
| 2008/0007241 A1 * | 1/2008 | Isham ..................... | H02M 1/08 323/285 |
| 2009/0010035 A1 | 1/2009 | Williams | |
| 2011/0095741 A1 | 4/2011 | Huang et al. | |
| 2012/0049825 A1 * | 3/2012 | Chen ..................... | H02M 3/156 323/284 |
| 2013/0293211 A1 * | 11/2013 | Chen ................... | H02M 3/1588 323/282 |
| 2014/0132641 A1 * | 5/2014 | Hussain ................. | G09G 5/10 345/690 |
| 2016/0065066 A1 * | 3/2016 | Zhang ................... | H02M 3/158 323/271 |

FOREIGN PATENT DOCUMENTS

| CN | 101796708 A | 8/2010 |
|---|---|---|
| TW | I394356 B | 4/2013 |

* cited by examiner

*Primary Examiner* — Harry Behm
(74) *Attorney, Agent, or Firm* — Rosenberg, Klein & Lee

(57) ABSTRACT

A voltage conversion circuit is disclosed. The voltage conversion circuit comprises an energy-storing inductor, an N-type transistor, a P-type transistor, a current comparator, a multiplexer, a first driver and a second driver. When load connected to the voltage conversion circuit is a light load, the P-type transistor will be switched off so as to avoid generating a switching current and the switching current flowing gate-source and gate-drain parasitic capacitor of the N-type transistor is generated from an input voltage. The number of N-type transistor and switching frequency also decrease accordingly so that voltage conversion efficiency of the voltage conversion circuit may be increased.

17 Claims, 9 Drawing Sheets

VOLTAGE CONVERSION CIRCUIT WITH VOLTAGE SELECTION OF TRANSISTOR BULK

BACKGROUND OF THE INVENTION

1. Field of the Invention

The instant disclosure relates to a voltage conversion circuit; in particular, to a voltage conversion circuit that can increase conversion efficiency.

2. Description of Related Art

With the electrical technology developed, people require more when using the electric products. In order to provide good products with friendly prices, how to effectively save the volume of the electric product becomes an important topic for the product designers. In the general electric devices, it needs lots of power groups provided as the work voltage, so in order to prevent from using lots of transformers having large volumes to provide power of different voltage values, the Power Converter becomes the most popular power supply device for the product designers.

Please refer to FIG. 1, FIG. 1 shows a circuit diagram of a traditional voltage conversion circuit. The traditional voltage conversion circuit 100 comprises an inductor L', a N type transistor QN, a P type transistor QP, a voltage controller 110 and an output capacitor COUT'. One terminal of the inductor L' is connected to the input voltage VIN'. The N type transistor QN has drain connected to another terminal of the inductor L', has gate receiving the first driving signal LG' and has source connected to a ground voltage GND'. The P type transistor QP has source connected to drain of the N type transistor QN, has gate connected to the second driving signal UG' and has drain connected to an output voltage VOUT'. One terminal of the output capacitor COUT' is connected to drain of the P type transistor QP and another terminal of the output capacitor COUT' is connected to the ground voltage GND'.

In the prior art, no matter the traditional voltage conversion circuit 100 connects to a light load or a heavy load, the first driving signal LG' and the second driving signal UG' have the same driving waveform. Therefore, when the N type transistor QN is switched on or switched off, the P type transistor QP would be correspondingly switched on or switched off. When the first driving signal LG' is transmitted between a high voltage level and a low voltage level, the N type transistor QN generates a parasitic capacitor Cgs' and forms a current path. Thus, the traditional voltage conversion circuit 100 would generate a switch current ISWN' flowing through the parasitic capacitor Cgs'. Likewise, when the second driving signal UG' is transited between a high voltage level and a low voltage level, the P type transistor QP would generate a parasitic capacitor Cgd' and forms another current path. Thus, the traditional voltage conversion circuit 100 would generate a switch current ISWP' flowing through the parasitic capacitor Cgd'. Therefore, the switch currents belong to the currents generated from the inside of the chip, and in the equation of the efficiency transformation, the switch currents ISWN' and ISWP' are part of the output current, and thus the conversion efficiency of the traditional voltage conversion circuit 100 would be decreased.

SUMMARY OF THE INVENTION

The instant disclosure provides a voltage conversion circuit, used for boosting an input voltage. The voltage conversion circuit comprises an energy-storing inductor, a N type transistor, a P type transistor, a current comparator, a multiplexer, a first driver and a second driver. The energy-storing inductor has one terminal connected to the input voltage. The N type transistor has drain connected to another terminal of the energy-storing inductor, has gate receiving a first driving signal and accordingly determines the switched-on or switched-off state, and has source connected to a ground voltage. The P type transistor has source connected to another terminal of the energy-storing inductor, has gate receiving a second driving signal and accordingly determines switched-on or switched-off state, and has drain outputting an output voltage. The current comparator is connected to source of the N type transistor for receiving a sensing current, wherein the current comparator compares the sensing current with a threshold current so as to determine load type and accordingly output a comparison signal. The multiplexer is electrically connected to the current comparator for receiving the comparison signal, wherein the multiplexer receives the input voltage and the output voltage and accordingly outputs a work voltage according to the comparison signal. The first driver is electrically connected to the multiplexer and the N type transistor. The first driver receives a pulse width control signal and the work voltage and accordingly outputs the first driving signal, wherein the first driving signal is an oscillating signal and high level voltage value of the first driving signal is equal to voltage value of the work voltage. The second driver is electrically connected to the current comparator and the P type transistor. The second driver receives the comparison signal, the pulse width control signal and a predetermined DC voltage and accordingly outputs the second driving signal. When current value of the sensing current is smaller than current value of the threshold current, the current comparator outputs the comparison signal with high voltage level, such that the work voltage is equal to the input voltage and voltage level of the second driving signal is equal to the predetermined DC voltage, so as to switch off the P type transistor. A switching current flowing through a parasitic capacitor of the N type transistor is generated from the input voltage.

In an embodiment of the instant disclosure, negative input terminal of the current comparator is electrically connected to source of the N type transistor and positive input terminal of the current comparator receives the threshold current.

In an embodiment of the instant disclosure, when the current value of the sensing current is smaller than the current value of the threshold current, it represents that the output voltage of the voltage conversion circuit is electrically connected to a light load, and when the current value of the sensing current is larger than the current value of the threshold current, it represents that the output voltage of the voltage conversion circuit is electrically connected to a heavy load.

In an embodiment of the instant disclosure, when the current value of the sensing current is larger than the current value of the threshold current, the current comparator outputs the comparison signal with low voltage level such that the work voltage is equal to the output voltage and the first driving signal and the second driving signal have the same waveform. The switching current flowing through the parasitic capacitor of the N type transistor is generated from the output voltage.

In an embodiment of the instant disclosure, the voltage conversion circuit further comprises a voltage selector. The voltage selector is electrically connected to the input voltage, the output voltage and bulk of the P type transistor. The P type transistor has a first body diode and a second body diode having a series-opposing connection therebetween, and source of the P type transistor is connected to anode of the first body diode.

In an embodiment of the instant disclosure, the N type transistor comprises a first transistor, a switch and a second transistor. The first transistor has drain connected to another terminal of the energy-storing inductor, has gate connected to the first driver so as to receive the first driving signal, and has source connected to the ground voltage. The switch has a first terminal connected to gate of the first transistor, and has a control terminal connected to the current comparator so as to receive the comparison signal and accordingly to determine the switched-on or switched-off state. The second transistor has drain connected to another terminal of the energy-storing inductor, has gate connected to a second terminal of the switch, and has source connected to the ground voltage. Width-length ratio of the second transistor is X times of width-length ratio of the first transistor, wherein X is a rational number larger than 1.

In an embodiment of the instant disclosure, when the comparison signal is at high voltage level, the switch enters into a switched-off state such that the second transistor enters into a switched-off state, so as to decrease width-length ratio of the N type transistor and to decrease capacitance of the parasitic capacitor, and thereby to decrease the current value of the switching current to increase conversion efficiency. When the comparison signal is at low voltage level, the switch enters into a switched on state such that the second transistor is coupled to the first transistor in parallel.

In an embodiment of the instant disclosure, the voltage conversion circuit further comprises a clock generator. The clock generator is electrically connected to the current comparator so as to receive the comparison signal. The clock generator is used for generating a clock signal and adjusting frequency of the clock signal according to the comparison signal. When the comparison signal is at low voltage level, the clock signal generated by the clock generator has a first oscillating frequency, and when the comparison signal is at high voltage level, the clock generator decreases the first oscillating frequency of the clock signal to a second oscillating frequency and thereby decreases power consumption of the voltage conversion circuit.

The instant disclosure further provides a voltage conversion method, used in a voltage conversion circuit. The voltage conversion circuit comprises an energy-storing inductor, a N type transistor, a P type transistor, a current comparator, a multiplexer, a first driver and a second driver. One terminal of the energy-storing inductor is connected to an input voltage. The N type transistor has drain connected to another terminal of the energy-storing inductor, has gate receiving a first driving signal and accordingly determines switched-on or switched-off state and has source connected to a ground voltage. The P type transistor has source connected to another terminal of the energy-storing inductor, has gate receiving a second driving signal and accordingly determines switched-on or switched-off state and has drain outputting an output voltage. The current comparator is electrically connected to source of the N type transistor so as to receive a sensing current, and the current comparator compares the sensing current with a threshold current so as to determine load type and to accordingly output a comparison signal. The multiplexer is electrically connected to the current comparator so as to receive the comparison signal, and the multiplexer receives the input voltage and the output voltage and outputs a work voltage according to the comparison signal. The first driver is electrically connected to the multiplexer and the N type transistor, and the first driver receives a pulse width control signal and the work voltage and accordingly outputs the first driving signal. The first driving signal is an oscillating signal and the high voltage value thereof equals to the voltage value of the work voltage. The second driver is electrically connected to the current comparator and the P type transistor, and the second driver receives the pulse width control signal and a predetermined DC voltage and accordingly outputs the second driving signal. When the current value of the sensing current is smaller than the threshold current, the current comparator outputs the comparison signal with high voltage level such that the work voltage is equal to the input voltage and voltage level of the second driving signal is equal to the predetermined DC voltage, and thereby the P type transistor is switched off. The switching current flowing through a parasitic capacitor of the N type transistor is generated from the input voltage. The voltage conversion method comprises: determining whether the sensing current is smaller than the threshold current via the current comparator; outputting the comparison signal with high voltage level via the current comparator when the current value of the sensing current is smaller than the current value of the threshold current; choosing the input voltage as a work voltage according to the comparison signal with high voltage level via the multiplexer; outputting the first driving signal via the first driver, wherein the first driving signal is an oscillation signal and the voltage level thereof is equal to voltage level of the work voltage; and making voltage level of the second driving signal equal to the predetermined DC voltage via the second driver and thereby switching off the P type transistor.

The instant disclosure further provides an electronic system. The electronic system comprises a voltage conversion circuit and a load. The voltage conversion circuit is used for receiving an input voltage and boosting the input voltage to become an output voltage. The load is electrically connected to the voltage conversion circuit so as to receive the output voltage.

To sum up, via the electric system, the voltage conversion circuit and the voltage conversion method thereof provided by the instant disclosure, when the current comparator determines that the current value of the sensing current is smaller than the current value of the threshold current, via the multiplexer and the first driver, the switching current flowing through the parasitic capacitor of the N type transistor is generated from the input voltage. In addition, the instant disclosure decreases the width-length ratio of the N type transistor so as to reduce the capacitance of the parasitic capacitor and thereby decreases the current value of the switching current in order to increase conversion efficiency of the voltage conversion circuit. Moreover, the instant disclosure reduces power consumption of the (voltage conversion circuit via decreasing the first oscillating frequency of the clock generator to the second oscillating frequency.

For further understanding of the instant disclosure, reference is made to the following detailed description illustrating the embodiments and examples of the instant disclosure. The description is only for illustrating the instant disclosure, not for limiting the scope of the claim.

BRIEF DESCRIPTION OF THE DRAWINGS

Embodiments are illustrated by way of example and not by way of limitation in the figures of the accompanying drawings, in which like references indicate similar elements and in which.

DETAILED DESCRIPTION OF PREFERRED EMBODIMENTS

The aforementioned illustrations and following detailed descriptions are exemplary for the purpose of further explaining the scope of the instant disclosure. Other objectives and advantages related to the instant disclosure will be illustrated in the subsequent descriptions and appended drawings.

It will be understood that, although the terms first, second, third, and the like, may be used herein to describe various elements, components, regions, layers and/or sections, these elements, components, regions, layers and/or sections should not be limited by these terms. These terms are only to distinguish one element, component, region, layer or section from another region, layer or section discussed below could be termed a second element, component, region, layer or section without departing from the teachings of the present disclosure. As used herein, the term "and/or" includes any and all combinations of one or more of the associated listed items.

[One Embodiment of the Voltage Conversion Circuit]

Figure 1:
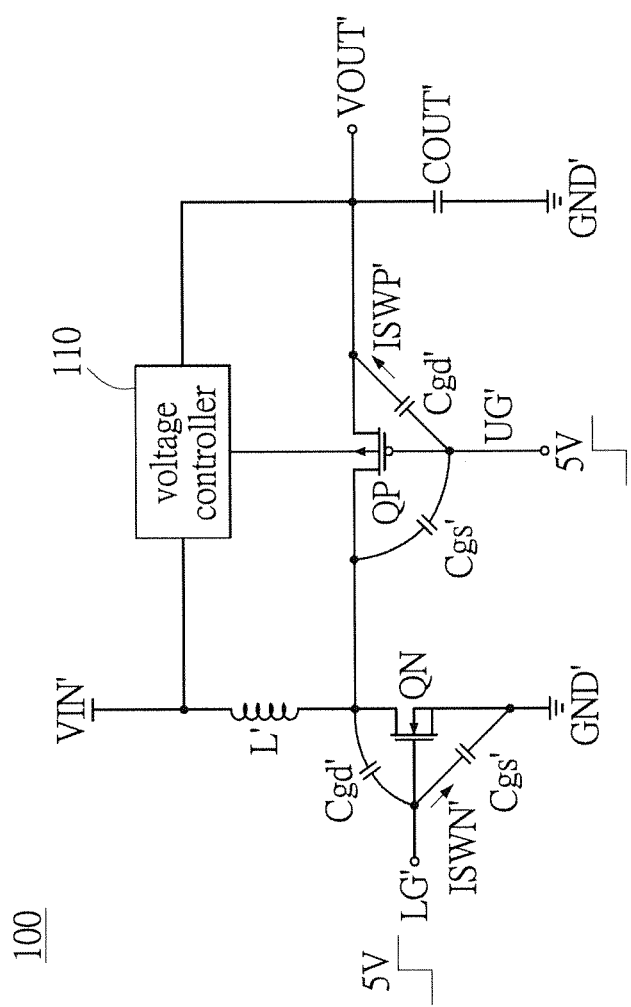
FIG. 1 shows a circuit diagram of a traditional voltage conversion circuit.
Figure 2:
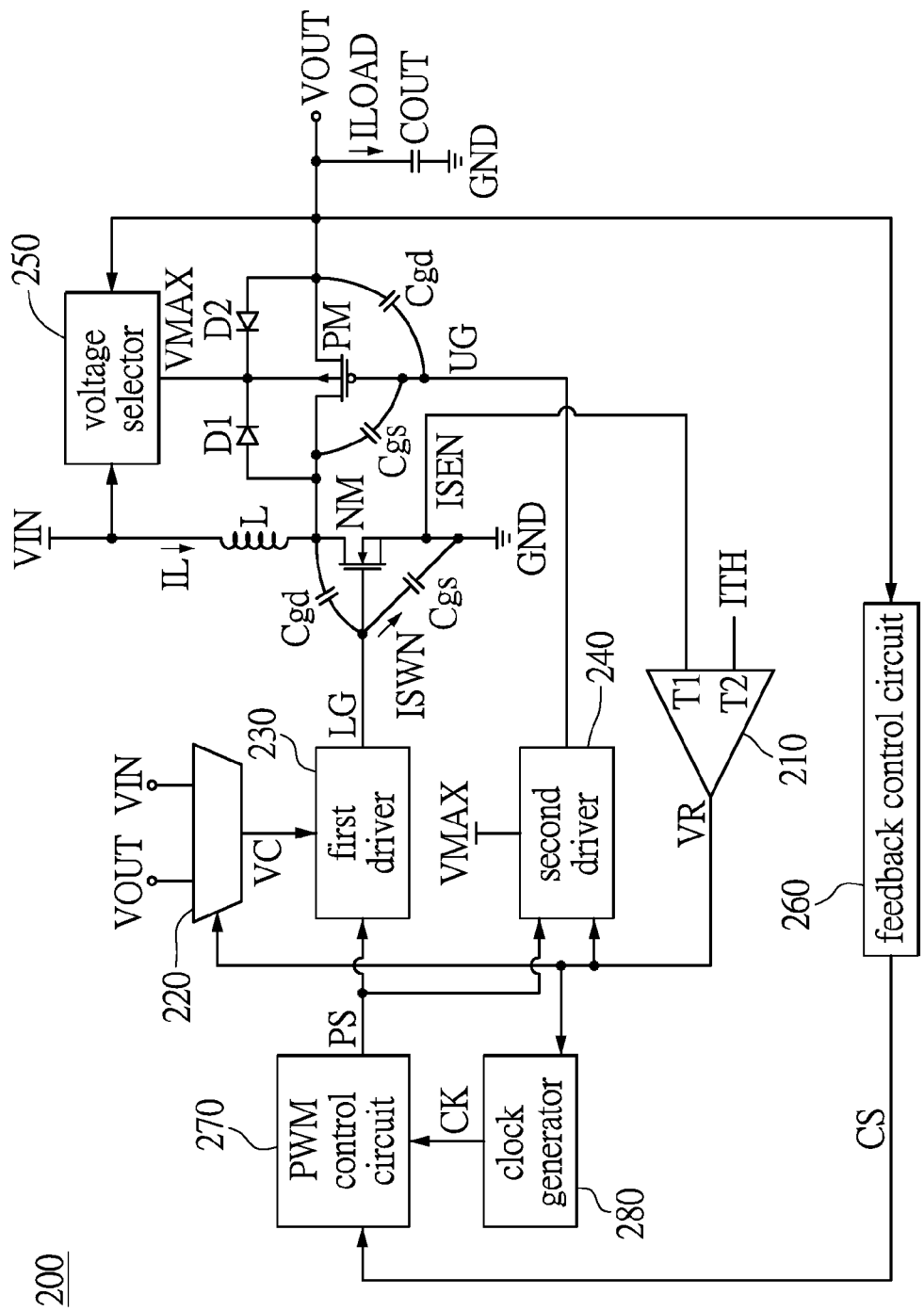
FIG. 2 shows a schematic block diagram of a voltage conversion circuit according to an embodiment of the instant disclosure.

Please refer to FIG. 2, FIG. 2 shows a schematic block diagram of a voltage conversion circuit according to an embodiment of the instant disclosure. In the present embodiment, the voltage conversion circuit 200 is used for boosting an input voltage VIN to become an output voltage VOUT, and the voltage conversion circuit 200 comprises an energy-storing inductor L, a N type transistor NM, a P type transistor PM, a current comparator 210, a multiplexer 220, a first driver 230, a second driver 240, a voltage selector 250, a feedback control circuit 260, a PWM control circuit 270 and a clock generator 280.

One terminal of the energy-storing inductor L is electrically connected to the input voltage VIN. The N type transistor NM has drain electrically connected to another terminal of the energy-storing inductor L, has gate electrically receiving a first driving signal LG, and has source electrically connected to a ground voltage GND. The P type transistor PM has source electrically connected to another terminal of the energy-storing inductor L, has gate receiving a second driving signal UG, and has drain outputting an output voltage VOUT. The P type transistor has a first body diode D1 and a second body diode D2 having a series-opposing connection therebetween. The P type transistor has source connected to anode of the first body diode D1. The negative input terminal T1 of the current comparator 210 is electrically connected to source of the N type transistor NM, and the positive input terminal T2 of the current comparator 210 receives a threshold current ITH. The first driver 230 is electrically connected to the multiplexer 220 and gate of the N type transistor NM. The second driver 240 is electrically connected to the current comparator 210 and gate of the P type transistor PM. The voltage selector 250 is electrically connected to the input voltage VIN, the output voltage VOUT and bulk of the P type transistor PM. The P type transistor has bulk electrically connected to the first body diode D1. The feedback control circuit 260 is electrically connected between the output voltage VOUT and the PWM control circuit 270. The PWM control circuit 270 is electrically connected to the first driver 230 and the second driver 240. The clock generator is electrically connected to the PWM control circuit 270 and the current comparator 210.

Regarding to the energy-storing inductor L, the energy-storing inductor L is used for drawing and storing power from the input voltage VIN, and has an inductor current IL flowing through the inductor L.

Regarding to the N type transistor NM, the N type transistor NM is used as a switch transistor, and the switched-on or switched-off state thereof is determined by the first driving signal LG.

Regarding to the P type transistor PM, the P type transistor PM is used as a switch transistor, and the switched-on or switched-off state thereof is determined by the second driving signal UG.

Regarding to the current comparator 210, the current comparator 210 is used for determining load type of the load connected to the voltage conversion circuit 200. That is, the current comparator 210 determines load type of the load connected to the voltage conversion circuit 200, a light one or a heavy one. In a further instruction, the current comparator 210 receives the sensing current ISEN and the threshold current ITH, and compares the current values of the sensing current ISEN and the threshold current ITH. Afterwards, the current comparator 210 outputs a comparison signal VR according to a result of the comparison of the above current values. In the present embodiment, when the current value of the sensing current ISEN is smaller than the current value of the threshold current ITH, it represents that one terminal of the output voltage VOUT of the voltage conversion circuit 200 is electrically connected to a light load, and the current comparator outputs a comparison signal VR with high voltage level. When the current value of the sensing current ISEN is larger than the current value of the threshold current ITH, it represents that one terminal of the output voltage VOUT of the voltage conversion circuit 200 is electrically connected to a heavy load, and the current comparator outputs a comparison signal VR with low voltage level. It is worth mentioning that, the current value of the threshold current ITH is determined by the user according to the curve of the conversion efficiency.

Regarding to the multiplexer 220, the multiplexer 220 is used for receiving the comparison signal VR, the input voltage VIN and the output voltage VOUT, and outputs a work voltage VC according to voltage level of the comparison signal VR. In further instruction, in the present embodiment, when the comparison signal is at high voltage level, the multiplexer 220 outputs an input voltage VIN as a work voltage VC, and when the comparison signal is at low voltage level, the multiplexer 220 outputs an output voltage VOUT as a work voltage VC.

Regarding to the first driver 230, the first driver 230 is used for receiving a pulse width control signal PS and the work voltage VC, and outputs a first driving signal LG to gate of the N type transistor NM according to the pulse width control signal PS and the work voltage VC. The first driving signal LG is an oscillating signal, and the voltage value of the high voltage level thereof is equal to the voltage value of the work voltage VC. In a further instruction, when the work voltage VC is the input voltage VIN and the voltage value of the input voltage VIN is 3.3 V, the voltage value of the high voltage level of the first driving signal LG is 3.3 V. When the work voltage VC is the output voltage VOUT and the voltage value of the output voltage VOUT is 5 V, the voltage value of the high voltage level of the first driving signal LG is 5 V.

Regarding to the second driver 240, the second driver 240 is used for receiving the comparison signal VR, the pulse width control signal PS and a predetermined DC voltage VMAX, and accordingly outputs a second driving signal UG to gate of the P type transistor PM. In a further instruction, when the current comparator 210 outputs VR with high voltage level, the second driver 240 outpus the predetermined DC voltage VMAX to gate of the P type transistor PM as the second driving signal UG so as to switch off the P type transistor PM. When the current comparator 210 outputs VR with low voltage level, the second driver 240 outputs the pulse width control signal PS to gate of the P type transistor PM as the second driving signal UG, such that the P type transistor PM is switched on according the second driving signal UG with low voltage level and switched off according to the second driving signal UG with high voltage level.

Regarding to the voltage selector 250, the voltage value outputted to bulk of the P type transistor by the voltage selector 250 is determined according to the voltage values of the input voltage VIN and the output voltage VOUT. For example, when the input voltage is 3.3 V and the output voltage is 5 V, the voltage selector 250 outputs a voltage of 5 V (same as the predetermined DC voltage VMAX) to bulk of the P type transistor PM. When the input voltage is 4.5 V and the output voltage is 3.3 V, the voltage selector 250 outputs a voltage of 4.5 V (same as the predetermined DC voltage VMAX) to bulk of the P type transistor PM.

Regarding to the feedback control circuit 260, the feedback control circuit 260 is used for detecting the output voltage VOUT and receiving the output voltage VOUT and the clock signal CK so as to stabilize the voltage conversion circuit 200, and accordingly outputs a feedback control signal CS to the PWM control circuit 270.

Regarding to the PWM control circuit 270, the PWM control circuit 270 receives the clock signal CK and the feedback control signal CS transmitted by the feedback control circuit 260, and outputs a pulse width control signal PS having a working duty ratio according to the feedback control signal CS to the first driver 230 and the second driver 240.

Regarding to the clock generator 280, the clock generator 280 is used for generating and transmitting a clock signal CK having the first oscillating frequency to the PWM control circuit 270 and the feedback control circuit 260.

In the following description is further instruction in teaching a work mechanism of the voltage conversion circuit 200. Before the following description, it is clarified that, for the convenience of understanding the instant disclosure, it is assumed that the voltage value of the input voltage VIN is 3.3 V, the voltage value of the output voltage VOUT is 5 V and the voltage value of the predetermined DC voltage VMAX is 5 V, but it is not limited thereto.

In the instant disclosure, one terminal of the output voltage VOUT of the voltage conversion circuit 200 is electrically connected to a light load or a heavy load. Thus, the voltage conversion circuit 200 makes a preliminary determination regarding to the load type via the current comparator 210 so as to determine the corresponding motions of the multiplexer 220, the first driver 230 and the second driver 240. The sensing current ISEN and the load current IL have a positive correlation, and thus the current comparator 210 obtains the load type information via detecting the sensing current ISEN. In a further instruction, when the current comparator 210 determines that the current value of the sensing current ISEN is smaller than the current value of the threshold current ITH, it represents that the output voltage VOUT of the voltage conversion circuit 200 is electrically connected to a light load, and the current comparator 210 outputs the comparison signal VR with high voltage level to the multiplexer 220 and the second driver 240. After that, the multiplexer 220 chooses the input voltage VIN as the work voltage VC according to the comparison signal VR with high voltage level, and transmits the work voltage VC to the first driver 230 so as to adjust the maximum amplitude of the pulse width control signal PS. Also, the second driver 240 outputs the predetermined DC voltage VMAX to gate of the P type transistor PM according to the comparison signal VR with high voltage level so as to switch off the P type transistor PM (at this time, the second driving signal UG is the predetermined DC voltage VMAX). The first driver 230 outputs the first driving signal LG, an oscillating signal, to gate of the N type transistor NM so as to control the switched-on state and the switch-ed off state of the N type transistor NM.

Figure 3:
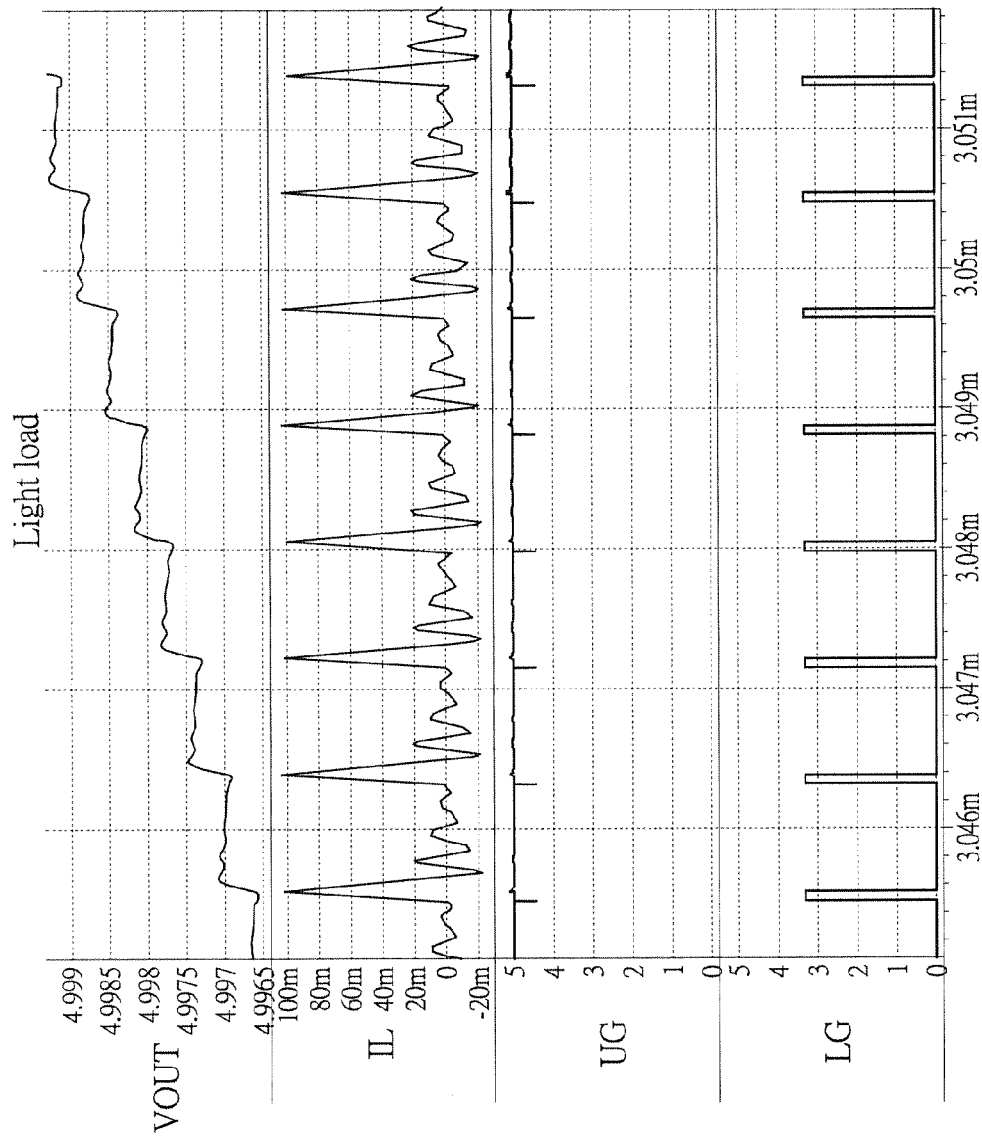
FIG. 3 shows a waveform diagram corresponding to the voltage conversion circuit connected to a light load according to an embodiment in FIG. 2 of the instant disclosure.

It is worth mentioning that, in conjunction with FIG. 2 and FIG. 3, FIG. 3 shows a waveform diagram corresponding to the voltage conversion circuit connected to a light load according to an embodiment in FIG. 2 of the instant disclosure. When the first driving signal LG is transited from a high voltage level to a low voltage level or from a low voltage level to a high voltage level, the N type transistor NM generates a parasitic capacitor Cgs between gate and source of the N type transistor NM and a parasitic capacitor Cgd between gate and drain of the N type transistor NM because of the high-frequency effect, and the switching currents ISWN flowing through the parasitic capacitors Cgd and Cgs of the N type transistor are generated from the input voltage VIN. Moreover, because the P type transistor PM is switched off according to the predetermined DC voltage VMAX, so the P type transistor PM would not have any high-frequency effect to draw any switching current. In detailed description, in the equation (1), Pe symbols for the conversion efficiency, Vo symbols for the output voltage, Io symbols for the output current, Vin symbols for the input voltage and Iin symbols for the input current. Comparing with the prior art, because the switching current ISWN is generated from the input voltage VIN, the switching current ISWN is considered part of the input current, in other words, the switching current ISWN is not considered the load current of the output voltage VOUT anymore.

$$Pe=(Vo \times Io)/(Vin \times Iin) \qquad \text{equation (1)}$$

Afterwards, as shown in FIG. 3, the second driving signal UG is maintained at the voltage level 5 V, so the P type transistor PM is always at a switched off state. When the first driving signal LG is at high voltage level, the N type transistor NM enters into the switched on state (the sensing current ISEN increases) according to the first driving signal LG and the input voltage VIN generates an inductor current IL flowing through the energy-storing inductor L so as to store power in the energy-storing inductor L. When the first driving signal LG is at low voltage level, the N type transistor NM enters into the switched off state (the sensing current ISEN decreases and approaches to zero) according to the first driving signal LG, and transmits power via currents into the output capacitor COUT so as to boost the input voltage Vin, such as 3 V, to the output voltage VOUT, such as 5 V. It should be noticed that, the P type transistor PM as the main current path is switched off, so power needs to be transmitted from the first body diode D1 and voltage selector 250 to the output capacitor COUT.

On the other hand, when the current comparator 210 determines that the current value of the sensing current ISEN is larger than the current value of the threshold current ITH, it represents that one terminal of the output voltage VOUT of the voltage conversion circuit 200 is electrically connected to a heavy load, and the current comparator 210 outputs the comparison signal VR with low voltage level to the multiplexer 220 and the second driver 240. After that, the multiplexer 220 chooses the output voltage VOUT as the work voltage VC according to the comparison signal VR with low voltage level and transmits the work voltage VC to the first driver 230 so as to adjust the maximum amplitude of the pulse width control signal PS. The second driver 240 makes the pulse width control signal PS to become the second driving signal UG according to the comparison signal VR with low voltage level and transmits the second driving signal UG to gate of the P type transistor PM so as to control the switched on state or the switched off state. Also, the first driver 230 outputs the first driving signal LG, an oscillating signal, to gate of the N type transistor so as to control the switched on state or the switched off state of the N type transistor.

Figure 4:
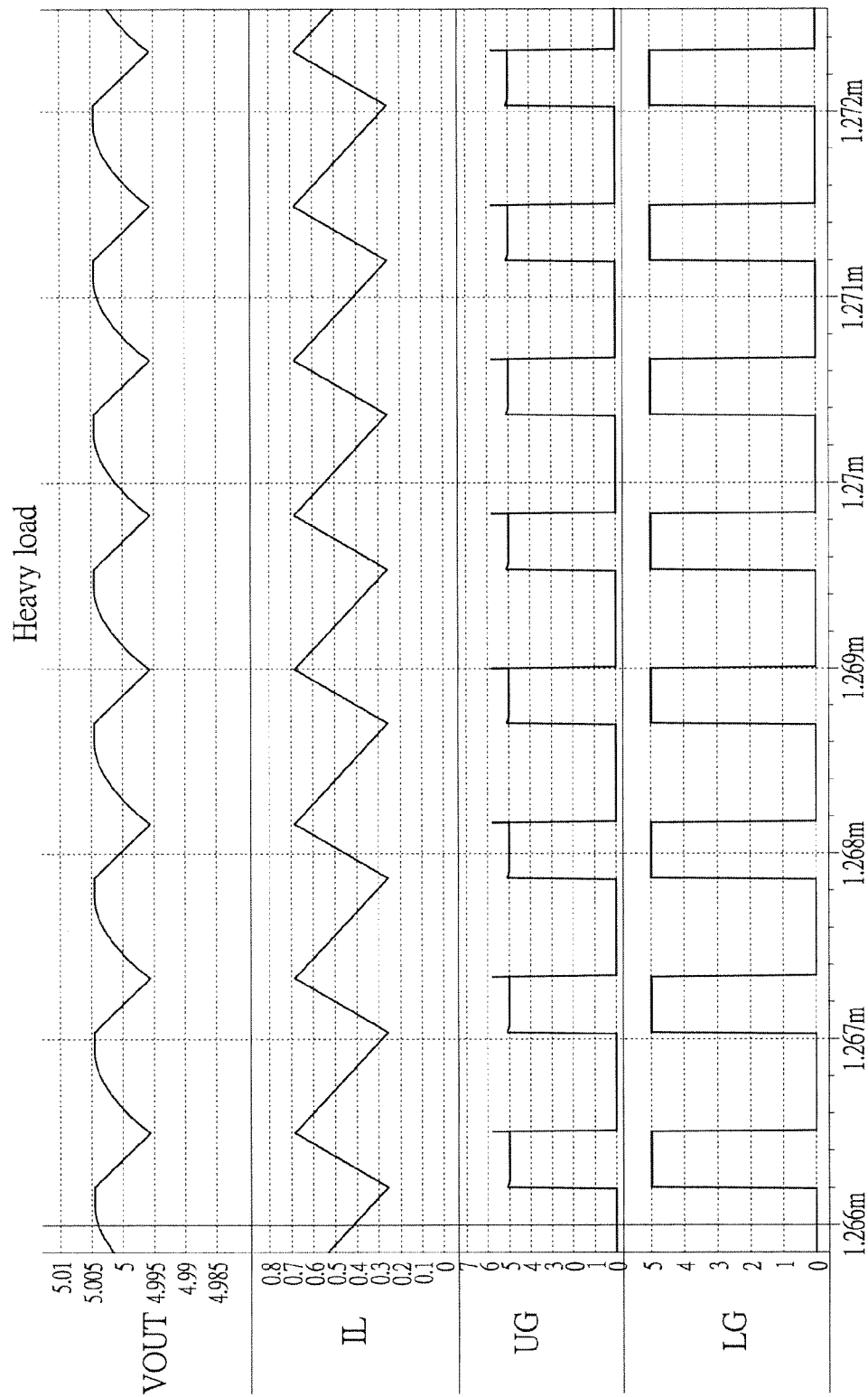
FIG. 4 shows a waveform diagram corresponding to the voltage conversion circuit connected to a heavy load according to an embodiment in FIG. 2 of the instant disclosure.

It is worth mentioning that, in conjunction with FIG. 2 and FIG. 4, FIG. 4 shows a waveform diagram corresponding to the voltage conversion circuit connected to a heavy load according to an embodiment in FIG. 2 of the instant disclosure. When the first driving signal LG is transited from a high voltage level to a low voltage level or from a low voltage level to a high voltage level, the N type transistor NM generates a parasitic capacitor Cgs between gate and source of the N type transistor NM and a parasitic capacitor Cgd between gate and drain of the N type transistor NM because of the high-frequency effect, and the switching currents ISWN flowing through the parasitic capacitors Cgs and Cgd of the N type transistor NM are generated by the output voltage VOUT. Additionally, when the second driving signal UG is transited from a high voltage level to a low voltage level or from a low voltage level to a high voltage level, the P type transistor generates a parasitic capacitor Cgd between gate and drain of the P type transistor PM and a parasitic capacitor Cgs between gate and source of the P type transistor because of the high-frequency effect, and the switching currents ISWN flowing through the parasitic capacitors Cgs and Cgd of the P type transistor PM are generated from the inside of the chip. At this time, the switching current ISWN of the N type transistor NM and the switching current ISWP of the P type transistor PM are part of the output current in the equation (1).

Afterwards, as shown in FIG. 4, the first driving signal LG outputted from the first driver 230 and the second driving signal UG outputted from the second driver 240 have the same wavefrom so the N type transistor NM and the P type transistor PM would be switched on alternatively. In a further instruction, when the first driving signal LG and the second driving signal UG are at high voltage level, the N type transistor enters into the switched-on state according to the first driving signal LG (the sensing current ISEN increases), and the P type transistor PM enters into the switched-off state according to the second driving signal UG. After that, the input voltage generates an inductor current IL flowing through the energy-storing inductor L so as to store power in the energy-storing inductor L. When the first driving signal LG and the second driving signal UG are at low voltage level, the N type transistor NM enters into the switched off state according to the first driving signal LG (the sensing current ISEN decreases), and the P type transistor PM enters into the switched-on state according the second driving signal UG and transmits power through currents into the output capacitor COUT so as to boost the input voltage VIN, such as 3 V, to the output voltage VOUT, such as 5 V.

Figure 5:
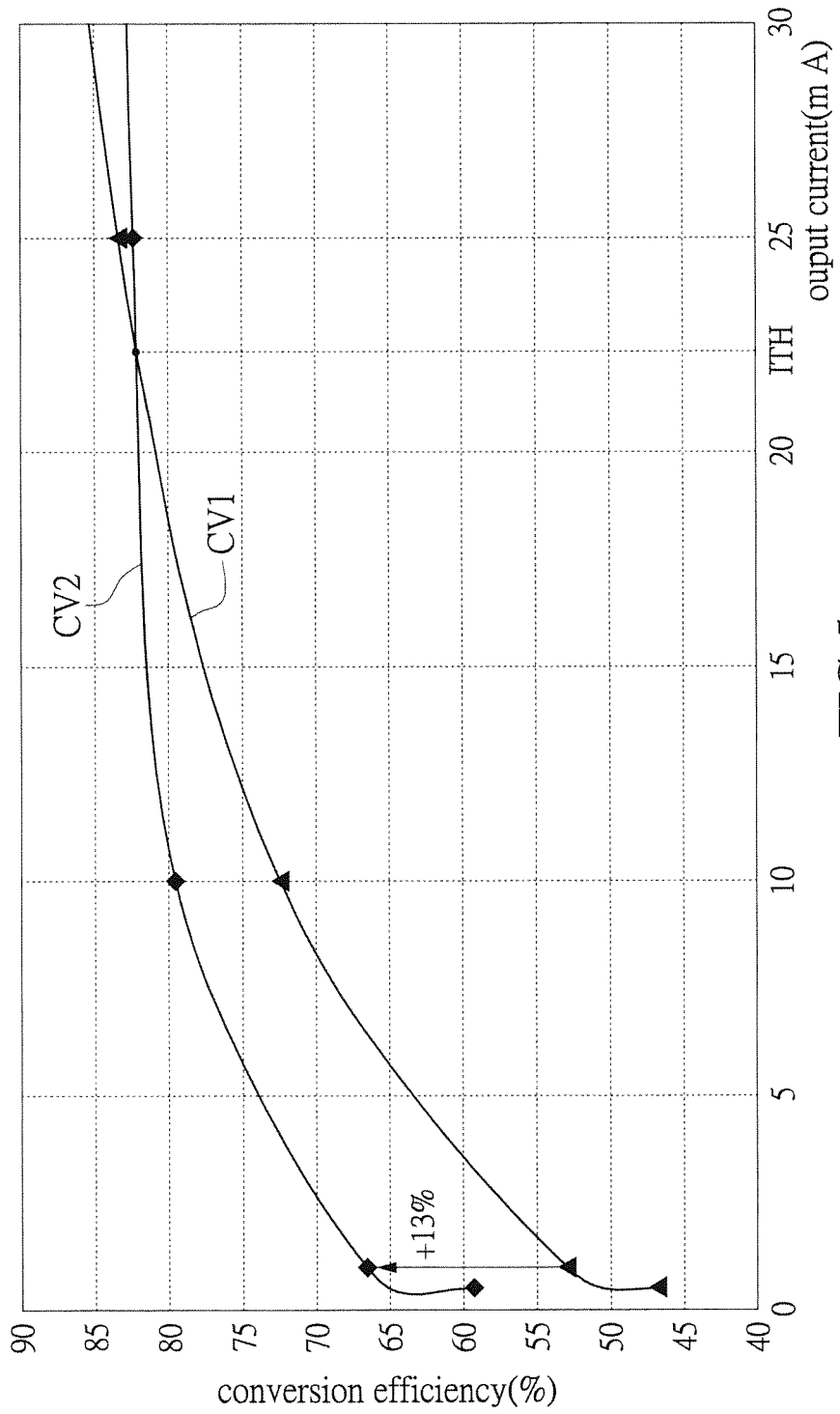
FIG. 5 shows a waveform of conversion efficiency of the voltage conversion circuit according to an embodiment of the instant disclosure.

Please refer to FIG. 5, FIG. 5 shows a waveform of conversion efficiency of the voltage conversion circuit according to an embodiment of the instant disclosure. As shown in FIG. 5, a horizontal axis represents the load current, whose unit is microampere (mA), and a vertical axis represents the conversion efficiency, whose unit is percentage (%). The curve CV1 represents the conversion efficiency of the traditional voltage conversion circuit, and the curve CV2 represents the conversion efficiency of the voltage conversion circuit connecting to a light load according to one embodiment of the instant disclosure. As shown in FIG. 5, the designer can set the cross point of the CV1 and the CV2 as the threshold current ITH, so as to distinguish the load type, a light one or a heavy one. To be brief, when the load current is smaller than the threshold current ITH, it represents that the voltage conversion circuit connects to a light load and has the relevant working mechanism of the instant disclosure applied, so as to increase the conversion efficiency. When the load current is larger than the threshold current ITH, it represents that the voltage conversion circuit connects to a heavy load and the high conversion efficiency thereof can be maintained via the traditional working mechanism. Therefore, it can be known from FIG. 5 that, the instant disclosure can increase the voltage conversion efficiency when the voltage conversion circuit connects to a light load, and the highest conversion efficiency thereof can reach to 13%.

Here is at least an embodiment for further instruction to present a specific operation flow of the voltage conversion circuit 200 of the instant disclosure.

In the following embodiments, there are only parts different from embodiments in FIG. 2 described, and the omitted parts are indicated to be identical to the embodiments in FIG. 2. In addition, for an easy instruction, similar reference numbers or symbols refer to elements alike.

[Another Embodiment of the Voltage Conversion Circuit]

In the present embodiment, when the voltage conversion circuit connects to a light load, the high-frequency effect can be reduced by decreasing the width-length ratio of the N type transistor NM via the switching mechanism, in other words, the capacitance of the parasitic capacitor can be reduced via the switching mechanism so as to further improve the conversion efficiency of the voltage conversion circuit.

Figure 6:
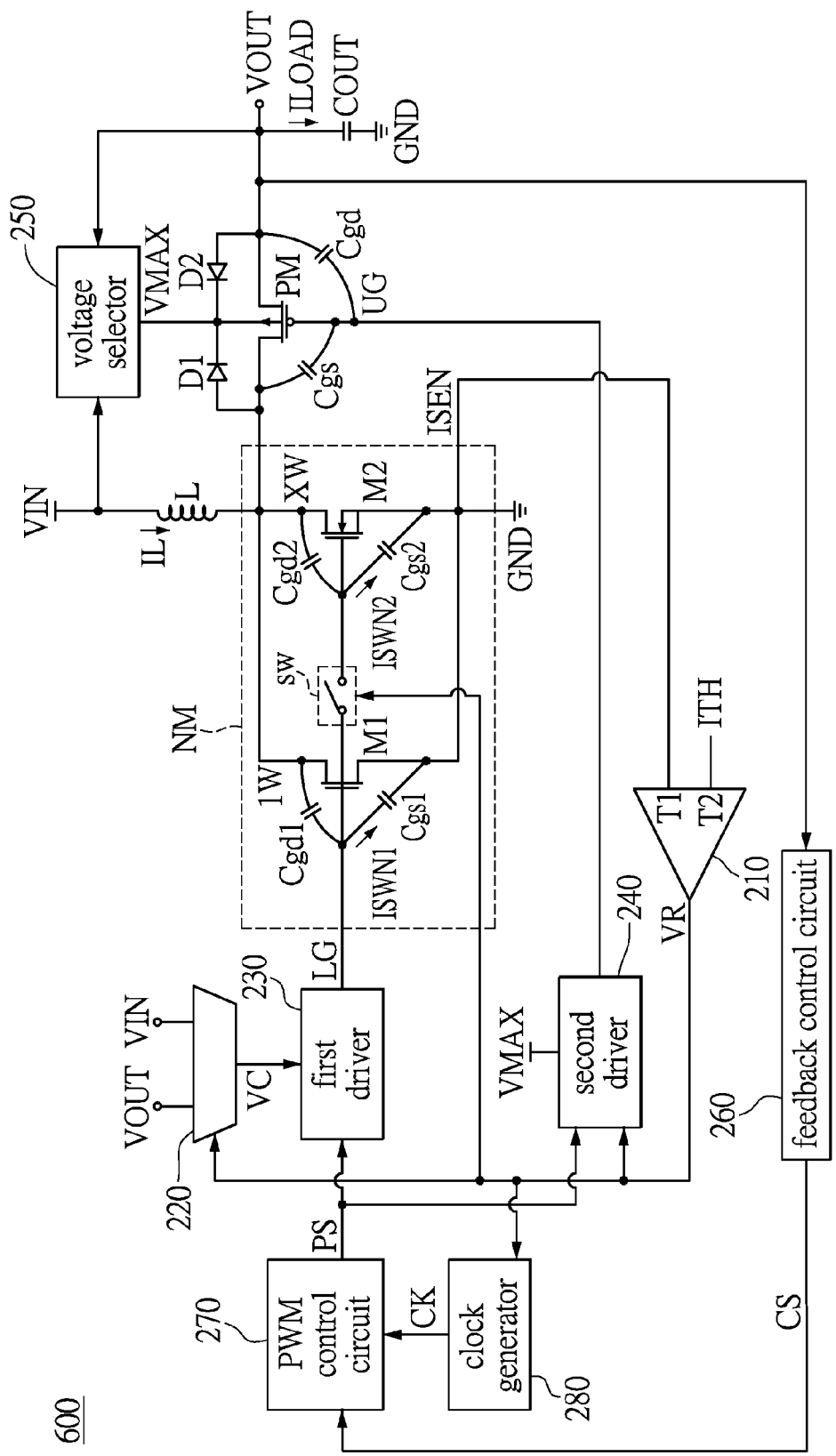
FIG. 6 shows a circuit diagram of the voltage conversion circuit according to another embodiment of the instant disclosure.

Please refer to FIG. 6, FIG. 6 shows a circuit diagram of the voltage conversion circuit according to another embodiment of the instant disclosure. As shown in FIG. 6, in the voltage conversion circuit 600 of the present embodiment, the N type transistor NM comprises a first transistor M1, a switch SW and a second transistor M2, in which the first transistor M1 and the second transistor M2 are both metal oxide semiconductor transistors. It needs to be noticed that, the width-length ratio of the second transistor M2 is X times of the width-length ratio of the first transistor M1, wherein X is a ratinoal number larger than 1. In the present embodiment, the width-length ratio of the first transistor M1 (W1/L1) equals to 1 and the width-length ratio of the second transistor M2 (W2/L2) equals to 99, and thus the width-length ratio of the N type transistor NM equals to 100.

The first transistor M1 has drain connected to another terminal of the energy-storing inductor L, has gate connected to the first driver 230 so as to receive the first driving signal LG, and has source connected the ground voltage GND. The first terminal of the switch SW is connected to gate of the first transistor M1, and the control terminal of the switch SW is connected to the current comparator 210. The second transistor M2 has drain connected to another terminal of the energy-storing inductor L, has gate connected to the second terminal of the switch SW, and has source connected to the ground voltage GND.

Regarding to the switch SW, the switch SW is a low-active switch. When the comparison signal VR is at high voltage level, the switch SW enters into the switched-off state such that the second transistor M2 enters into the switched-off state, which thereby decreases width-length ratio of the N type transistor NM and the capacitance of the parasitic capacitor and further decreases the current value of the switching current so as to increase the voltage conversion efficiency. When the comparison signal VR is at low voltage level, the switch SW enters into the switched-on state such that the second transistor M2 is coupled to the first transistor M1 in parallel.

In the following description is further instruction in teaching a work mechanism of the voltage conversion circuit 600. Before a further instruction, it is clarified that, for the convenience of understanding the instant disclosure, it is assumed that the input voltage VIN is 3.3V, the output voltage VOUT is 5V and the predetermined DC voltage VMAX is 5V, but it is not limited thereto.

Likewise, when the current comparator 210 determines that the current value of the sensing current ISEN is smaller than the current value of the threshold current ITH, it represents that the output voltage VOUT of the voltage conversion circuit 600 is electrically connected to a light load and the current comparator 210 outputs the comparison signal VR with high voltage level to the switch SW, the multiplexer 220, the second driver 240 and the clock generator 280. Afterwards, the multiplexer 220 chooses the input voltage VIN as the work voltage VC according to the comparison signal VR with high voltage level and transmits the work voltage VC to the first driver 230 so as to adjust the maximum amplitude of the pulse width control signal PS. The switch SW would switch off the second transistor M2 according to the comparison signal VR with high voltage level. The second driver 240 outputs the predetermined DC voltage VMAX to gate of the P type transistor PM according to the comparison signal VR with high voltage level so as to switch off the P type transistor PM (at this time, the second driving signal UG is the predetermined DC voltage VMAX). The first driver 230 outputs the first driving signal LG, an oscillating signal, to gate of the first transistor M1 so as to control the switched-on and switched-off states of the first transistor M1.

When the first driving signal LG is transited from a high voltage level to a low voltage level or from a low voltage level to a high voltage level, the first transistor M1 generates a parasitic capacitor Cgs1 between gate and source of the first transistor M1 and a parasitic capacitor Cgd1 between gate and drain of the first transistor M1, and the switching currents ISWN1 flowing through the parasitic capacitors Cgs1 and Cgd1 of the first transistor M1 are generated from the input voltage VIN. In addition, the second transistor M2 is switched off so there are no parasitic capacitors Cgs2 and Cgd2 generated due to the high-frequency effect. Therefore, the width-length ratio of the N type transistor NM would decrease from 100 to 1, which further drastically reduces the capacitance of the parasitic capacitor and also decreases the current value of the switching current. From another point of view, the number of the switched-on transistors in the N type transistor NM decreases from 100 transistors to 1 transistor. Moreover, the P type transistor PM is switched off according to the predetermined DC voltage VMAX so the P type transistor PM would not generate any high-frequency effect to draw any switching current.

Likewise, when the first driving signal LG is at high voltage level, the first transistor M1 enters into the switched-on state according to the first driving signal LG and the input voltage VIN generates an inductor current flowing through the energy-storing inductor L so as to store power into the energy-storing inductor L. When the first driving signal LG is at low voltage level, the first transistor M1 enters into the switched-off state according to the first driving signal LG and transmits power via currents into the output capacitor COUT so as to boost the input voltage VIN, such as 3V, to the output voltage VOUT, such 5V. It needs to be noticed that, the P type transistor PM as the main current path is switched off so power needs to be transmitted from the first body diode D1 to the output capacitor COUT.

On the other hand, when the current comparator 210 determines that the current value of the sensing current ISEN is larger than the current value of the threshold current ITH, it represents that the output voltage VOUT of the voltage conversion circuit 600 is electrically connected to a heavy load and that the current comparator 210 generates the comparison signal VR with low voltage level to the switch SW, the multiplexer 220, the second driver 240 and the clock generator 280. Afterwards, the multiplexer 220 chooses the output voltage VOUT as the work voltage VC according to the comparison signal VR with low voltage level and transmits the work voltage VC to the first driver 230 so as to adjust the maximum amplitude of the pulse width control signal PS. The switch SW enters into the switched-on state according to the comparison signal VR with low voltage level such that the second transistor M2 is coupled to the first transistor M1 in parallel. The second driver 240 makes the pulse width control signal PS as the second driving signal UG according to the comparison signal VR with low voltage level and transmits the second driving signal UG to gate of the P type transistor PM so as to control the switched-on and switched-off states of the P type transistor PM. Also, the first driver 230 outputs the first driving signal LG, an oscillating signal, to gate of the first transistor M1 so as to control the switched-on and switched-off states of the first transistor M1.

When the first driving signal LG is transited from a high voltage level to a low voltage level or from a low voltage level to a high voltage level, the first transistor M1 and the second transistor M2 respectively generates the parasitic capacitor Cgs1 between gate and source of the first transistor M1 and the parasitic capacitor Cgs2 between gate and source of the second transistor M2 because of the high-frequency effect. Also, the switching currents ISWN1 and ISWN2 flowing through the parasitic capacitor Cgs1 and the parasitic capacitor Cgs2 are generated from the input voltage VIN. Besides, when the second driving signal UG is transited from a high voltage level to a low voltage level or from a low voltage level to a high voltage level, the P type transistor PM generates a parasitic capacitor between gate and drain of the P type transistor PM because of the high-frequency effect, the switching current flowing through the parasitic capacitor of the N type transistor NM is generated from the inside of the chip. The switching currents ISWN1 of the first transistor M1 and ISWN2 of the second transistor M2 are part of the output current in the equation (1).

After that, the first driving signal LG outputted by the first driver 230 and the second driving signal UG outputted by the second driver 240 have the same waveform so the transistor M1, the transistor M2 and the P type transistor PM would be switched on alternatively. In a further instruction, when the first driving signal LG and the second driving signal UG are at high voltage level, the transistor M1 and the transistor M2 enter into the switched-on state according to the first driving signal LG and the P type transistor PM enters into the switched-off state according to the second driving signal UG. Afterwards, the input voltage VIN generates an inductor current flowing through the energy-storing inductor L so as to store power into the energy-storing inductor L. When the first driving signal LG and the second driving signal UG are at low voltage level, the transistor M1 and the transistor M2 enter into the switched-off state according to the first driving signal LG, and the P type transistor PM enters into the switched-on state according to the second driving signal UG and transmits power via currents into the output capacitor COUT so as to boost the input voltage VIN, such as 3.3V, to the output voltage VOUT, such as 5V.

[Still Another Embodiment of the Voltage Conversion Circuit]

Figure 7:
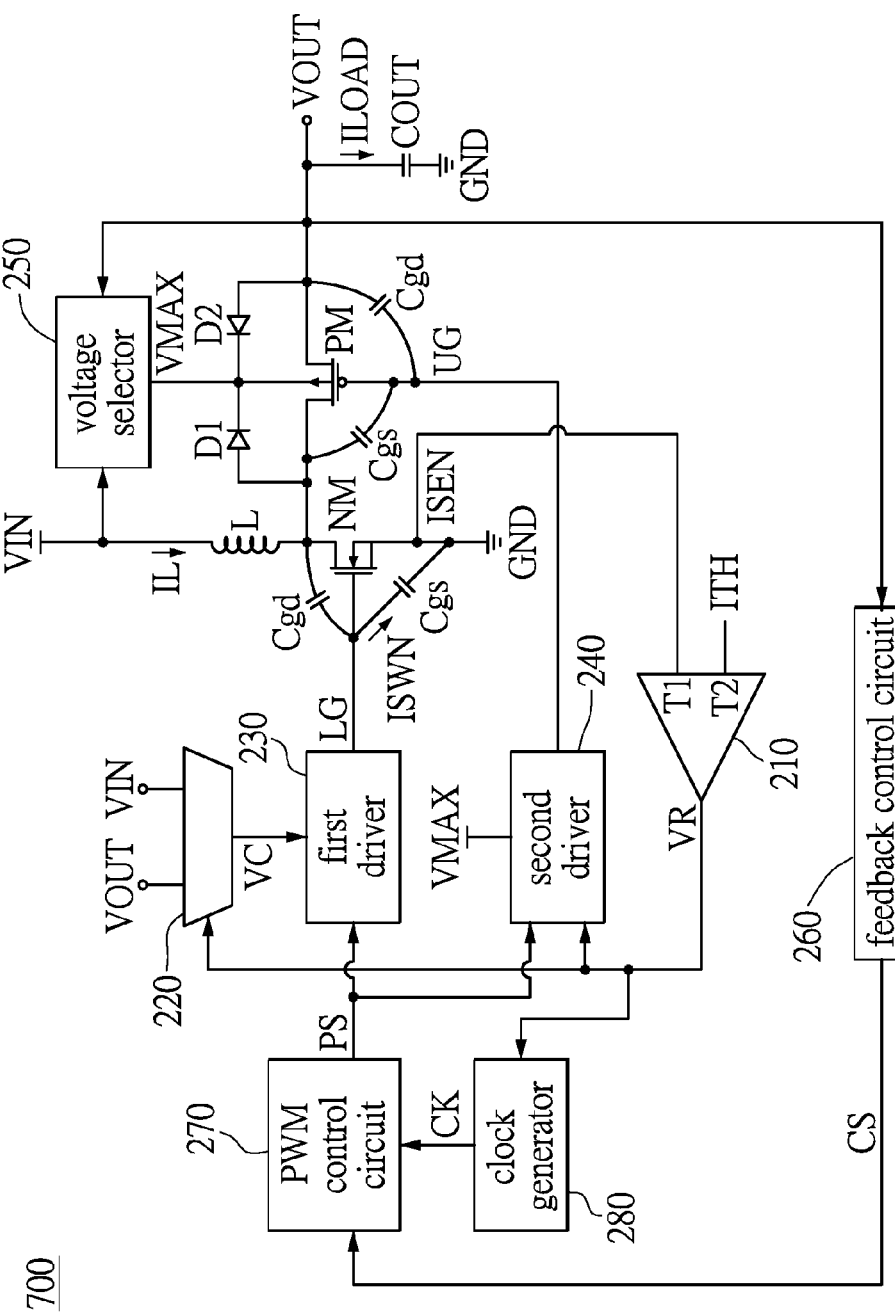
FIG. 7 shows a circuit diagram of the voltage conversion circuit according to still another embodiment of the instant disclosure.

Please refer to FIG. 7, FIG. 7 shows a circuit diagram of the voltage conversion circuit according to still another embodiment of the instant disclosure. Different form the embodiment in the FIG. 2, in the voltage conversion circuit of the present embodiment, the clock generator 280 is further electrically connected to the output terminal of the current comparator 210 so as to receive the comparison signal VR, and the clock generator 280 can adjust the frequency of the clock signal CK according to the comparison signal VR.

In the present embodiment, when the current comparator 210 determines that the current value of the sensing current ISEN is smaller than the current value of the threshold current ITH, the current comparator 210 outputs the comparison signal VR with high voltage level to the clock generator 280, the multiplexer 220 and the second driver 240. When the clock generator 280 receives the comparison signal VR with high voltage level, the clock generator 280 decreases the first oscillating frequency of the clock signal CK to the second oscillating frequency, and thereby reduces the power consumption of the voltage conversion circuit 700 and increases the conversion efficiency. When the current comparator 210 determines that the current value of the sensing current ISEN is larger than the current value of the threshold current ITH, the current comparator 210 outputs the comparison signal VR with low voltage level to the clock generator 280, the multiplexer 220 and the second driver 240. When the clock generator 280 receives the comparison signal VR with low voltage level, the clock generator 280 increases the second oscillating frequency of the clock signal CK to the first oscillating frequency. The rest of the operation mechanism of the voltage conversion circuit 700 is similar to the voltage conversion circuit 200 of the embodiment in FIG. 2, and thus it is not repeated thereto.

Figure 8:
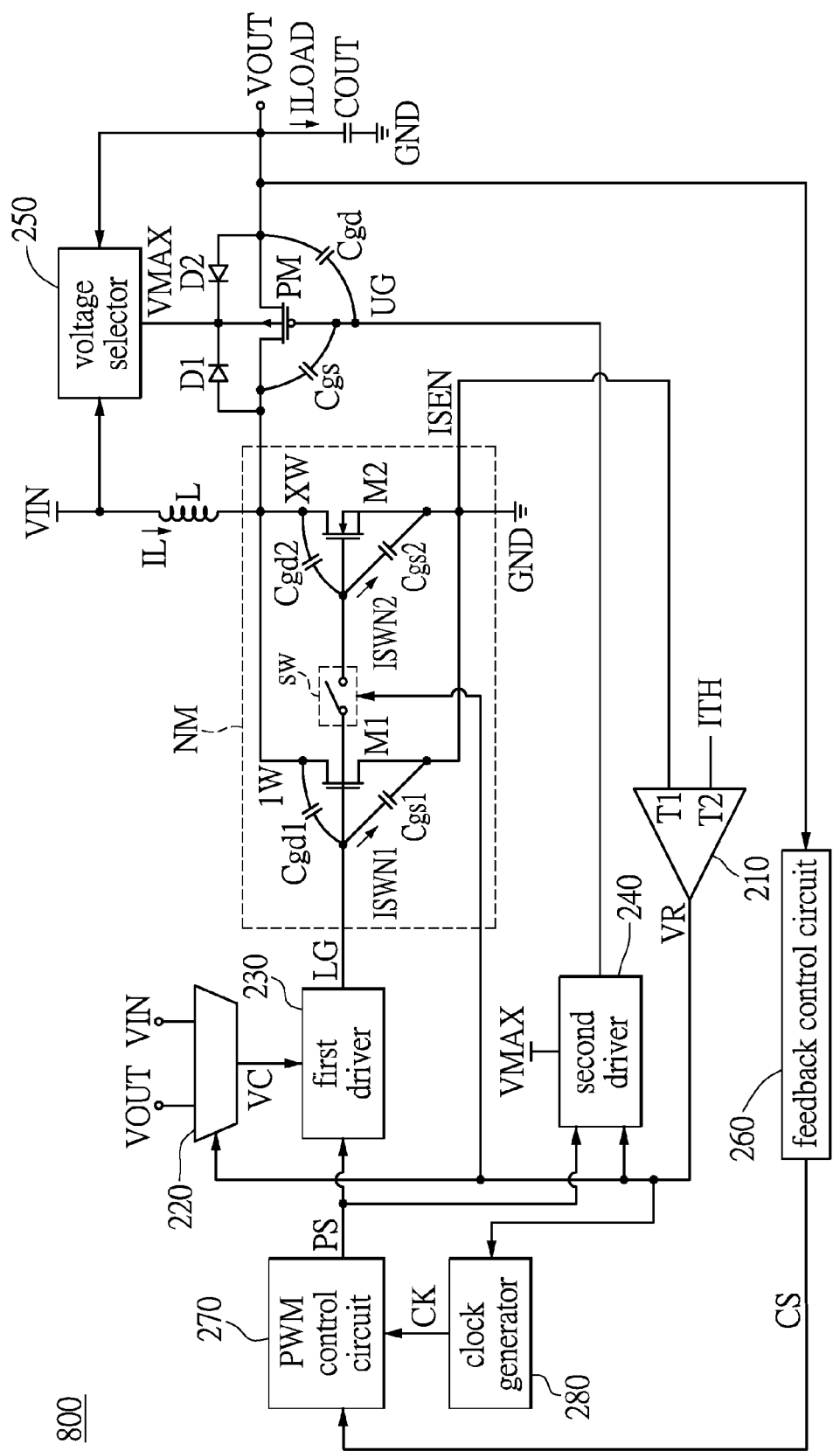
FIG. 8 shows a circuit diagram of the voltage conversion circuit according to another embodiment of the instant disclosure.

Please refer to FIG. 8, FIG. 8 shows a circuit diagram of the voltage conversion circuit according to another embodiment of the instant disclosure. Different from the embodiment in FIG. 6, in the voltage conversion circuit 800 of the present embodiment, the clock generator 280 is further electrically connected to the output terminal of the current comparator 210 so as to receive the comparison signal VR, and the clock generator 280 can adjust the frequency of the clock signal CK according to the comparison signal VR.

In the present embodiment, when the current comparator 210 determines that the current value of the sensing current ISEN is smaller than the current value of the threshold current ITH, the current comparator 210 outputs the comparison signal VR with high voltage level to the clock generator 280, the multiplexer 220 and the second driver 240. When the clock generator 280 receives the comparison signal VR with high voltage level, the clock generator 280 decreases the first oscillating frequency of the clock signal CK to the second oscillating frequency, so as to reduce the power consumption of the voltage conversion circuit 800 and increases the conversion efficiency. When the current comparator 210 determines that the current value of the sensing current ISEN is larger than the current value of the threshold current ITH, the current comparator 210 outputs the comparison signal VR with low voltage level to the clock generator 280, the multiplexer 220 and the second driver 240. When the clock generator 280 receives the comparison signal VR with low voltage level, the clock generator 280 increases the second oscillating frequency of the clock signal CK to the first oscillating frequency. The rest of the operation mechanism of the voltage conversion circuit 800 is similar to the voltage conversion circuit 600 of the embodiment in FIG. 6, and thus it is not repeated thereto.

[One Embodiment of the Voltage Conversion Method]

Figure 9:
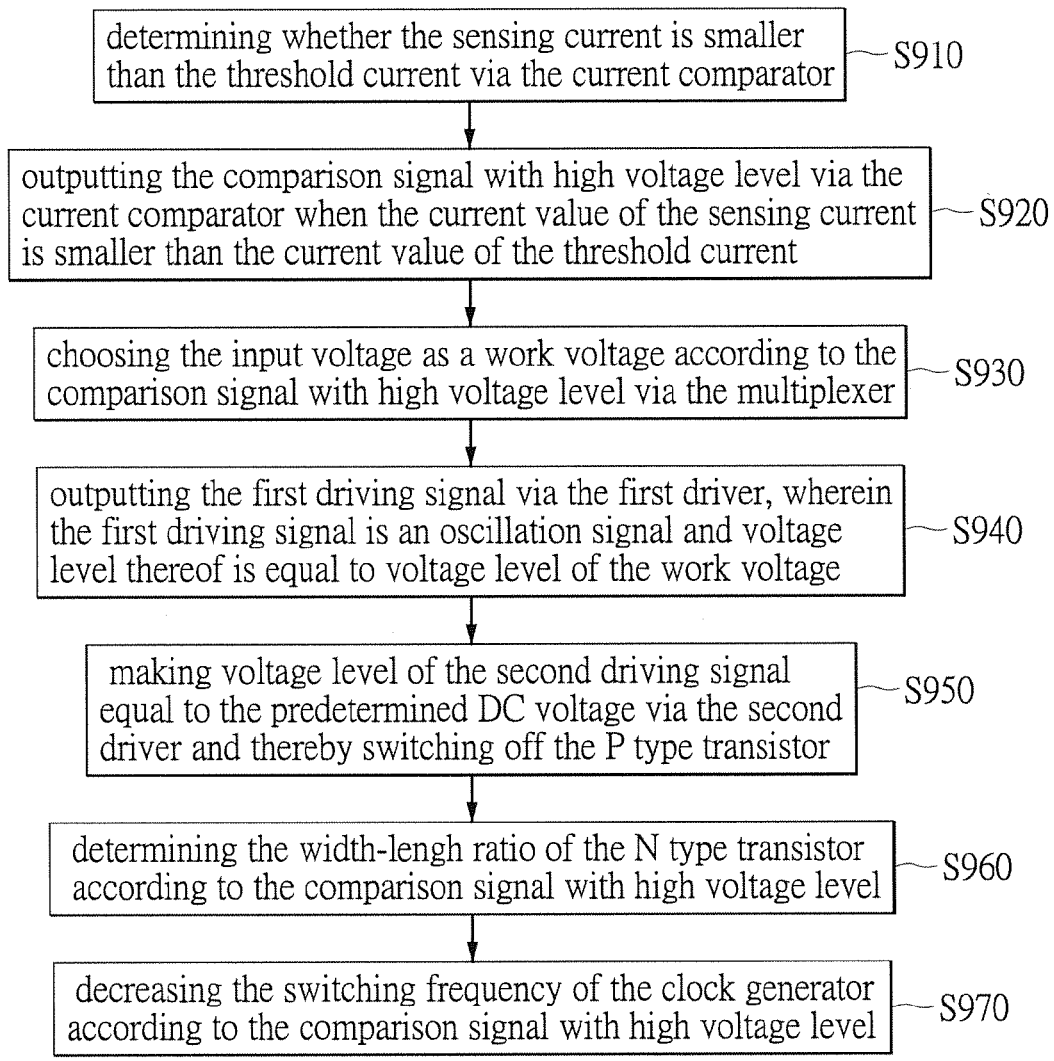
FIG. 9 shows a flow chart of the voltage conversion method according to an embodiment of the instant disclosure.

Please refer to FIG. 9, FIG. 9 shows a flow chart of the voltage conversion method according to an embodiment of the instant disclosure. The method of the present embodiment may be conducted in the voltage conversion circuits 200, 600, 700 or 800 shown in FIGS. 2 and 6-8, and thus please refer to FIGS. 2 and 6-8 for further understanding. The voltage conversion method comprises steps as follows: determining whether the sensing current is smaller than the threshold current via the current comparator (Step S910); outputting the comparison signal with high voltage level via the current comparator when the current value of the sensing current is smaller than the current value of the threshold current (Step S920); choosing the input voltage as a work voltage according to the comparison signal with high voltage level via the multiplexer (Step S930); outputting the first driving signal via the first driver, wherein the first driving signal is an oscillation signal and voltage level thereof is equal to voltage level of the work voltage (Step S940); making voltage level of the second driving signal equal to the predetermined DC voltage via the second driver and thereby switching off the P type transistor (Step S950); determining the width-length ratio of the N type transistor according to the comparison signal with high voltage level (Step S960); and decreasing the switching frequency of the clock generator according to the comparison signal with high voltage level (Step S970).

Relevant details of the steps of the voltage conversion method regarding the voltage conversion circuit are described in the embodiments of FIGS. 2-8, and thus it is not repeated thereto. It is clarified that, a sequence of steps in FIG. 9 is set for a need to instruct easily, and thus the sequence of the steps is not used as a condition in demonstrating the embodiments of the instant disclosure.

[One Embodiment of the Electronic System]

Figure 10:
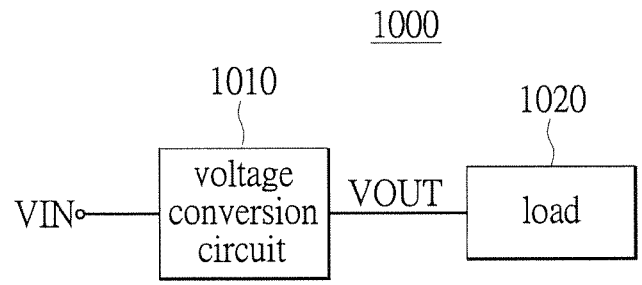
FIG. 10 shows a schematic block diagram of the electronic system according to an embodiment of the instant disclosure.

Please refer to FIG. 10, FIG. 10 shows a schematic block diagram of the electronic system according to an embodiment of the instant disclosure. The electronic system 100 comprises a voltage conversion circuit 1010 and a load 1020 electrically connected to the voltage conversion circuit 1010. The voltage conversion circuit 1010 is used for boosting an input voltage VIN to the output voltage VOUT and transmits the output voltage VOUT to the load 1020. The load 1020 receives the output voltage VOUT. The voltage conversion circuit 1010 may be the voltage conversion circuits 200, 600, 700 or 800 described in the above embodiments. The input voltage VIN may be the direct voltage or the system voltage generated by the household alternating current source received by the power adaptor. The electronic system 100 may be any type of system inside the electric device and the electric device may be a portable device or a mobile device for example.

To sum up, via the electric system, the voltage conversion circuit and the voltage conversion method thereof provided by the instant disclosure, when the current comparator determines that the current value of the sensing current is smaller than the current value of the threshold current, via the multiplexer and the first driver, the switching current flowing through the parasitic capacitor of the N type transistor is generated from the input voltage.

In at least one of the embodiments of the instant disclosure, the voltage conversion circuit decreases the width-length ratio of the N type transistor via a switch so as to reduce the capacitance of the parasitic capacitor and further decrease the current value of the switching current in order to increase the conversion efficiency of the voltage conversion circuit.

In at least one of the embodiments of the instant disclosure, the voltage conversion circuit decreases the first oscillating frequency of the clock generator to the second oscillating frequency so as to reduce the power consumption of the voltage conversion circuit.

The descriptions illustrated supra set forth simply the preferred embodiments of the instant disclosure; however, the characteristics of the instant disclosure are by no means restricted thereto. All changes, alternations, or modifications conveniently considered by those skilled in the art are deemed to be encompassed within the scope of the instant disclosure delineated by the following claims.

What is claimed is:

1. A voltage conversion circuit, used for boosting an input voltage, the voltage conversion circuit comprising:
    an energy-storing inductor, having one terminal connected to the input voltage;
    a N type transistor, having drain connected to another terminal of the energy-storing inductor, having gate receiving a first driving signal and accordingly determining switched-on or switched-off state, having source connected to a ground voltage;
    a P type transistor, having source connected to another terminal of the energy-storing inductor, having gate receiving a second driving signal and accordingly determining switched-on or switched-off state, having drain outputting an output voltage;
    a current comparator, connected to source of the N type transistor for receiving a current value of a sensing current, wherein the current comparator compares the current value of the sensing current and a current value of a threshold current so as to determine load type and accordingly outputs a comparison signal;
    a multiplexer, electrically connected to the current comparator for receiving the comparison signal, wherein the multiplexer receives the input voltage and outputting voltage and accordingly output a work voltage according to the comparison signal;
    a first driver, electrically connected to the multiplexer and the N type transistor, the first driver receiving a pulse width control signal and the work voltage and accordingly output the first driving signal, wherein the first driving signal is an oscillating signal and high level voltage value of the first driving signal is equal to voltage value of the work voltage;
    a second driver, electrically connected to the current comparator and the P type transistor, the second driver receiving the comparison signal, the pulse width control signal and a predetermined DC voltage and accordingly outputting the second driving signal; and
    a voltage selector, electrically connected to the input voltage, the output voltage and bulk of the P type transistor, and the P type transistor having a first body diode and a second body diode having a series-opposing connection therebetween, source of the P type transistor connected to anode of the first body diode,
    wherein when current value of the sensing current is smaller than current value of the threshold current, the current comparator outputs the comparison signal with high voltage level, such that the work voltage is equal to the input voltage and voltage level of the second driving signal is the predetermined DC voltage so as to switch off the P type transistor, wherein a switching current flowing through a parasitic capacitor of the N type transistor is generated from the input voltage.

2. The voltage conversion circuit according to claim 1, wherein negative input terminal of the current comparator is electrically connected to source of the N type transistor and positive input terminal of the current comparator receives the threshold current.

3. The voltage conversion circuit according to claim 1, wherein when the current value of the sensing current is smaller than the current value of the threshold current, it represents that the output voltage of the voltage conversion circuit is electrically connected to a light load, and when the current value of the sensing current is larger than the current value of the threshold current, it represents that the output voltage of the voltage conversion circuit is electrically connected to a heavy load.

4. The voltage conversion circuit according to claim 1, wherein when the current value of the sensing current is larger than the current value of the threshold current, the current comparator outputs the comparison signal with low voltage level such that the work voltage is equal to the output voltage and the first driving signal and the second driving signal have the same wave form, wherein the switching current flowing through the parasitic capacitor of the N type transistor is generated from the output voltage.

5. The voltage conversion circuit according to claim 1, wherein the N type transistor comprises:
    a first transistor, having drain connected to another terminal of the energy-storing inductor, having gate connected to the first driver so as to receive the first driving signal and having source connected to the ground voltage;
    a switch, having a first terminal connected to gate of the first transistor and having a control terminal connected to the current comparator so as to receive the comparison signal and accordingly to determine switched-on or switched-off state; and
    a second transistor, having drain connected to another terminal of the energy-storing inductor, having gate connected to a second terminal of the switch and having source connected to the ground voltage, width-length ratio of the second transistor is X times of width length ratio of the first transistor, wherein X is a rational number larger than 1.

6. The voltage conversion circuit according to claim 5, wherein when the comparison signal is at high voltage level, the switch enters into a switched-off state such that the second transistor enters into switched-off state, so as to decrease width-length ratio of the N type transistor and decrease capacitance of the parasitic capacitor, thereby to decrease the current value of the switching current to increase conversion efficiency; when the comparison signal is at low voltage level, the switch enters into switched-on state such that the second transistor is coupled to the first transistor in parallel.

7. The voltage conversion circuit according to claim 5, further comprising:
a clock generator, electrically connected to the current comparator so as to receive the comparison signal, the clock generator used for generating a clock signal and adjusting frequency of the clock signal according to the comparison signal;
wherein when the comparison signal is at low voltage level, the clock signal generated by the clock generator has a first oscillating frequency, when the comparison signal is at high voltage level, the clock generator decreases the first oscillating frequency of the clock signal to a second oscillating frequency and thereby decreases power consumption of the voltage conversion circuit.

8. The voltage conversion circuit according to claim 1, further comprising:
a clock generator, electrically connected to the current comparator so as to receive the comparison signal; the clock generator used for generating a clock signal and adjusting frequency of the clock signal according to the comparison signal;
wherein when the comparison signal is at low voltage level, the clock signal generated by the clock generator has a first oscillating frequency, when the comparison signal is at high voltage level, the clock generator decreases the first oscillating frequency of the clock signal to a second oscillating frequency and thereby decreases power consumption of the voltage conversion circuit.

9. A voltage conversion method, used in a voltage conversion circuit, the voltage conversion circuit comprising an energy-storing inductor, a N type transistor, a P type transistor, a current comparator, a multiplexer, a first driver, a second driver and a voltage selector, one terminal of the energy-storing inductor connected to an input voltage, the N type transistor having drain connected to another terminal of the energy-storing inductor, having gate receiving a first driving signal and accordingly determining switched-on or switched-off state and having source connected to a ground voltage, the P type transistor having source connected to another terminal of the energy-storing inductor, having gate receiving a second driving signal and accordingly determining switched-on or switched-off state and having drain outputting an output voltage, the current comparator connected to source of the N type transistor so as to receive a current value of a sensing current and the current comparator comparing the value of the sensing current with a current value of a threshold current so as to determine load type and to accordingly output a comparison signal, the multiplexer electrically connected to the current comparator so as to receive the comparison signal and the multiplexer receiving the input voltage and the output voltage and outputting a work voltage according to the comparison signal, the first driver electrically connected to the multiplexer and the N type transistor, the first driver receiving a pulse width control signal and the work voltage and accordingly outputting the first driving signal, the second driver electrically connected to the current comparator and the P type transistor, the second driver receiving the comparison signal, the pulse width control signal and a predetermined DC voltage and accordingly outputting the second driving signal, the voltage selector electrically connected to the input voltage, the output voltage and bulk of the P type transistor, and the P type transistor having a first body diode and a second body diode having a series-opposing connection therebetween, source of the P type transistor connected to anode of the first body diode, the voltage conversion method comprising:

determining whether the current value of the sensing current is smaller than the current value of the threshold current via the current comparator;
outputting the comparison signal with high voltage level via the current comparator when the current value of the sensing current is smaller than the current value of the threshold current;
choosing the input voltage as a work voltage according to the comparison signal with high voltage level via the multiplexer;
outputting the first driving signal via the first driver, wherein the first driving signal is an oscillation signal and voltage level thereof is equal to voltage level of the work voltage; and
making voltage level of the second driving signal equal to the predetermined DC voltage via the second driver and thereby switching off the P type transistor;
wherein the switching current flowing through a parasitic capacitor of the N type transistor is generated from the input voltage.

10. The voltage conversion method according to claim 9, further comprising:
determining width-length ratio of the N type transistor according to voltage level of the comparison signal;
wherein negative input terminal of the current comparator is electrically connected to source of the N type transistor, and positive input terminal of the current comparator receives the threshold current.

11. The voltage conversion method according to claim 10, wherein the N type transistor comprises:
a first transistor, having drain connected to another terminal of the energy-storing inductor, having gate connected to the first driver so as to receive the first driving signal and having source connected to the ground voltage;
a switch, having a first terminal connected to gate of the first transistor, having a control terminal connected to the current comparator so as to receive the comparison signal and accordingly determining switched-on or switched-off state; and
a second transistor, having drain connected to another terminal of the energy-storing inductor, having gate connected to a second terminal of the switch and having source connected to the ground voltage, width-length ratio of the second transistor is X times of length ratio of the first transistor, wherein X is a rational number larger than 1.

12. The voltage conversion method according to claim 11, wherein when the comparison signal is at high voltage level, the switch enters into switched-off state such that the second transistor enters into switched-off state, so as to decrease width-length ratio of the N type transistor and to decrease capacitance of the parasitic capacitor, and thereby to decrease the current value of the switching current so as to increase conversion efficiency; when the comparison signal is at low voltage level, the switch enters into switched-on state such that the second transistor is coupled to the first transistor in parallel.

13. The voltage conversion method according to claim 10, wherein the voltage conversion circuit further comprises:
a clock generator, electrically connected to the current comparator so as to receive the comparison signal, the clock generator used for generating a clock signal and adjusting frequency of the clock signal according to the comparison signal;
wherein when the comparison signal is at low voltage level, the clock signal generated by the clock generator has a first oscillating frequency, and when the comparison signal is at high voltage level, the clock generator decreases the first oscillating frequency of the clock signal to a second oscillating frequency, and thereby decreases power consumption of the voltage conversion circuit.

14. The voltage conversion method according to claim 13, wherein the voltage conversion circuit further comprises:
a clock generator, electrically connected to the current comparator so as to receive the comparison signal, the clock generator used for generating a clock signal and adjusting frequency of the clock signal according to the comparison signal;
wherein when the comparison signal is at low voltage level, the clock signal generated by the clock generator has a first oscillating frequency, and when the comparison signal is at high voltage level, the clock generator decreases the first oscillating frequency of the clock signal to a second oscillating frequency and thereby decreases power consumption of the voltage conversion circuit.

15. The voltage conversion method according to claim 9, wherein when the current value of the sensing current is smaller than the current value of the threshold current, it represents that the output voltage of the voltage conversion circuit is electrically connected to a light load, and when the current value of the sensing current is larger than the current value of the threshold current, it represents that the output voltage of the voltage conversion circuit is electrically connected to a heavy load.

16. The voltage conversion method according to claim 9, wherein when the current value of the sensing current is larger than the current value of the threshold current, the current comparator outputs the comparison signal with low voltage level such that the work voltage is equal to the output voltage and the first driving signal and the second driving signal have the same waveform, wherein the switching current flowing through the parasitic capacitor of the N type transistor is generated from the output voltage.

17. An electronic system, comprising:
a voltage conversion circuit, used for boosting an input voltage, the voltage conversion circuit comprising:
an energy-storing inductor, having one terminal connected to the input voltage;
a N type transistor, having drain connected to another terminal of the energy-storing inductor, having gate receiving a first driving signal and accordingly determining switched-on or switched-off state and having source connected to a ground voltage;
a P type transistor, having source connected to another terminal of the energy-storing inductor, having gate receiving a second driving signal and accordingly determining switched-on or switched-off state and having drain outputting an output voltage;
a current comparator, connected to source of the N type transistor so as to receive a current value of a sensing current, the current comparator compare the current value of the sensing current with a current value of a threshold current so as to determine load type and accordingly output a comparison signal;
a multiplexer, electrically connected to the current comparator so as to receive the comparison signal, the multiplexer receiving the input voltage and the output voltage and outputting a work voltage according to the comparison signal;
a first driver, electrically connected to the multiplexer and the N type transistor, the first driver receiving a pulse width control signal and the work voltage and accordingly outputting the first driving signal, wherein the first driving signal is an oscillation signal and voltage value of high voltage level is equal to voltage level of the work voltage; and
a second driver, electrically connected to the P type transistor, the second driver receiving the pulse width control signal and a predetermined DC voltage with high voltage level and accordingly outputting the second driving signal; and
a voltage selector, electrically connected to the input voltage, the output voltage and bulk of the P type transistor, and the P type transistor having a first body diode and a second body diode having a series-opposing connection therebetween, source of the P type transistor connected to anode of the first body diode,
wherein when the current value of the sensing current is smaller than the current value of the threshold current, the current comparator outputs the comparison signal with high voltage level, such that the work voltage is equal to the input voltage and voltage level of the second driving signal is equal to the predetermined DC voltage, so as to switch off the P type transistor, wherein a switching current flowing through a parasitic capacitor of the N type transistor is generated from the input voltage;
a load, electrically connected to the voltage conversion circuit so as to receive the output voltage.

* * * * *